United States Patent [19]
Kleiner et al.

[11] Patent Number: 4,800,253
[45] Date of Patent: Jan. 24, 1989

[54] ELECTRICAL DEVICES CONTAINING CONDUCTIVE POLYMERS

[75] Inventors: Lothar Kleiner, Los Altos; Martin Matthiesen, Fremont, both of Calif.

[73] Assignee: Raychem Corporation, Menlo Park, Calif.

[21] Appl. No.: 89,093

[22] Filed: Aug. 25, 1987

Related U.S. Application Data

[63] Continuation-in-part of Ser. No. 787,218, Oct. 15, 1985, Pat. No. 4,689,475.

[30] Foreign Application Priority Data

Oct. 14, 1986 [EP] European Pat. Off. ............ 0223404

[51] Int. Cl.⁴ .............................................. H05B 3/10
[52] U.S. Cl. .................................................. 219/553
[58] Field of Search ................ 219/541, 544, 553; 361/433, 305, 306, 273, 323; 338/22, 254, 255

[56] References Cited

U.S. PATENT DOCUMENTS

| | | | |
|---|---|---|---|
| 2,740,732 | 4/1956 | Peck et al. | 361/304 X |
| 3,061,501 | 10/1962 | Dittman et al. | 338/255 X |
| 3,220,897 | 11/1965 | Conley et al. | 148/34 |
| 3,353,124 | 11/1967 | Dilger | 361/305 X |
| 3,410,984 | 11/1968 | Sandford et al. | 219/543 X |
| 3,654,533 | 4/1972 | Porta et al. | 361/305 X |
| 3,861,029 | 1/1975 | Smith-Johannsen et al. | 29/611 |
| 4,177,376 | 12/1979 | Horsma et al. | 219/553 |
| 4,190,878 | 2/1980 | Förster | 361/305 |
| 4,237,441 | 12/1980 | Van Konynenburg et al. | 338/22 |
| 4,305,111 | 12/1981 | Förster | 361/305 X |
| 4,315,237 | 2/1982 | Middleman et al. | 338/22 |
| 4,334,148 | 6/1982 | Kampe | 219/553 |
| 4,341,949 | 7/1982 | Steiner et al. | 219/553 |
| 4,413,301 | 11/1983 | Middleman et al. | 361/106 |
| 4,426,339 | 1/1984 | Kamath et al. | 264/22 |
| 4,444,708 | 4/1984 | Gale et al. | 264/105 |
| 4,454,379 | 6/1984 | Cleveland et al. | 174/107 |
| 4,459,473 | 7/1984 | Kamath | 264/22 |
| 4,484,252 | 11/1984 | Ruijgrok et al. | 361/433 W |
| 4,544,828 | 10/1985 | Shigenobu et al. | 219/543 X |
| 4,689,475 | 8/1987 | Kleiner et al. | 219/553 |

FOREIGN PATENT DOCUMENTS

| | | |
|---|---|---|
| 0144187 | 6/1985 | European Pat. Off. |
| 0158410 | 10/1985 | European Pat. Off. |
| 2939470 | 4/1981 | Fed. Rep. of Germany |
| 44446 | 11/1980 | Japan ................ 361/323 |

Primary Examiner—Donald A. Griffin
Attorney, Agent, or Firm—Timothy H. P. Richardson; Herbert G. Burkard

[57] ABSTRACT

Electrical devices which comprise at least one metal electrode and a conductive polymer element in contact therewith, wherein the metal surface which contacts the conductive polymer has a roughened or otherwise treated surface to improve its adhesion to the conductive polymer. The metal electrode is preferably an electrodeposited foil. The conductive polymer preferably exhibits PTC behavior. The devices include heaters and circuit protection devices. The improved adhesion results in improved physical and electrical stability, and broadens the range of conductive polymer compositions which can be used in a number of important applications.

17 Claims, 1 Drawing Sheet

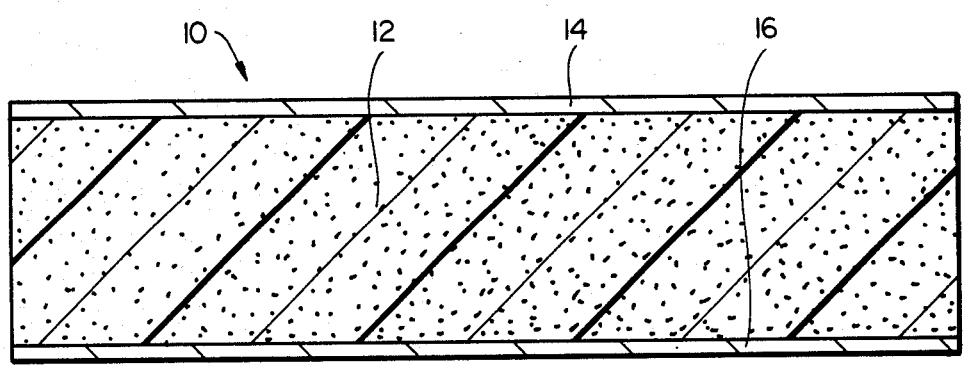
FIG_1

ELECTRICAL DEVICES CONTAINING CONDUCTIVE POLYMERS

BACKGROUND OF THE INVENTION

CROSS REFERENCE TO RELATED APPLICATION

This application is a continuation-in-part of our co-pending commonly assigned application Ser. No. 787,218, filed 10-15-85 the entire disclosure of which is incorporated herein by reference.

FIELD OF THE INVENTION

This invention relates to electrical devices comprising conductive polymer compositions.

INTRODUCTION TO THE INVENTION

Conductive polymers are well known. They comprise a particulate conductive filler which is dispersed in, or otherwise held together by, an organic polymer. They can be used in circuits in which current passes through them, e.g. in heaters and circuit protection devices, and in such use they may exhibit what is known as PTC (positive temperature coefficient) or ZTC (zero temperature coefficient) behavior. The term "PTC behavior" is usually used in the art, and is so used in this specification, to denote a composition which, in the operating temperature range, has an $R_{14}$ value of at least 2.5 or an $R_{100}$ value of at least 10, preferably both, and which preferably has an $R_{30}$ value of at least 6, where $R_{14}$ is the ratio of the resistivities at the end and the beginning of the 14° C. temperature range showing the greatest increase in resistivity, $R_{100}$ is the ratio of the resistivities at the end and the beginning of the 100° C. temperature range showing the greatest increase in resistivity, and $R_{30}$ is the ratio of the resistivities at the end and the beginning of the 30° C. temperature range showing the greatest increase in resistivity. The term "ZTC behavior" is usually used in the art, and is so used in this specification, to denote a composition which does not show PTC behavior in the operating temperature range; thus the term is used to include (a) compositions which show no substantial change in resistivity over the operating temperature range (e.g. from room temperature to 100° C.), (b) compositions which show substantial increases in resistivity over the operating temperature range but still do not have $R_{14}$, $R_{30}$ or $R_{100}$ values as specified above, (c) compositions which show substantial decreases in resistivity over the operating temperature range [often denoted NTC (negative temperature coefficient) compositions], and (d) compositions as defined in (a), (b) and (c) which exhibit PTC behavior at temperatures above the operating temperature range.

Documents describing conductive polymer compositions and devices comprising them include U.S. Pat. Nos. 2,952,761, 2,978,665, 3,243,753, 3,351,882, 3,571,777, 3,757,086, 3,793,716, 3,823,217, 3,858,144, 3,861,029, 3,950,604, 4,017,715, 4,072,848, 4,085,286, 4,117,312, 4,177,376, 4,177,446, 4,188,276, 4,237,441, 4,242,573, 4,246,468, 4,250,400, 4,252,692, 4,255,698, 4,271,350, 4,272,471, 4,304,987, 4,309,596, 4,309,597, 4,314,230, 4,314,231, 4,315,237, 4,317,027, 4,318,881, 4,327,351, 4,330,704, 4,334,351, 4,352,083, 4,361,799, 4,388,607, 4,398,084, 4,413,301, 4,425,397, 4,426,339, 4,426,633, 4,427,877, 4,435,639, 4,429,216, 4,442,139, 4,459,473, 4,481,498, 4,476,450, 4,502,929; 4,514,620, 4,517,449, and 4,534,889; J. Applied Polymer Science 19, 813-815 (1975), Klason and Kubat; Polymer Engineering and Science 18, 649-653 (1978), Narkis et al; and commonly assigned U.S. Ser. Nos. 601,424 now abandoned, published as German OLS No. 1,634,999; 732,792 (Van Konynenburg et al), now abandoned, published as German OLS No. 2,746,602; 798,154 (Horsma et al), now abandoned, published as German OLS No. 2,821,799; 141,984 (Gotcher et al), now abandoned, published as European Application No. 38,718; 141,988 (Fouts et al), now abandoned, published as European Application No. 38,718, 141,989 (Evans), published as European Application No. 38,713, 141,991 (Fouts et al), published as European Application No. 38,714, 150,909 (Sopory), published as UK Application No. 2,076,106A, 250,491 (Jacobs et al) published as European Application No. 63,440, 274,010 (Walty et al), now abandoned, 300,709 and 423,589 (Van Konynenburg et al), published as European Application No. 74,281, 369,309 (Midgley et al), published as European Application No. 92,406, 483,633 (Wasley), 606,033 (Leary et al), published as European Application No. 119,807, 599,047 and 598,048 (Masia et al), published as European Application No. 84,304,502.2, 524,482 (Tomlinson et al), published as European Application No. 84,305,584.7, 534,913 (McKinley), now abandoned, 552,649 (Jensen et al), published as European Application No. 84,307,984.9, 573,099 (Batliwalla et al) and 904,736 (Penneck et al), published as UK Patent Nos. 1,470,502 and 1,470,503, 650,918 (Batliwalla et al, 650,920 (Batliwalla et al, 663,014 (Batliwalla et al), 735,408 (Batliwalla et al), 650,919 (Batliwalla et al), 650,921 (Kheder), 711,790 (Carlomagno), 667,799 (Frank), 711,908 (Ratell), 687,120, (Leary et al), 691,291 (Hauptly et al), 711,907 (Ratell), 711,909 (Deep et al), 720,118 (Soni et al), 711,710 (Bliven), 711,910 (Au et al), 716,780 (Sandberg), 735,409 (Batliwalla et al), 741,657 (Morrow et al), 744,170 (Lahlough et al), and 764,894 (Batliwalla et al). The disclosure of each of the patents, publications and applications referred to above is incorporated herein by reference.

SUMMARY OF THE INVENTION

The electrodes which have been used to make physical and electrical contact with conductive polymers include solid and stranded wires, metal foils, and expanded and perforated metal sheets. We have now discovered that improved physical and electrical properties can be obtained through the use of electrodes which have a microrough surface which is in direct physical and electrical contact with the conductive polymer. The term "microrough" is used herein to denote a degree of surface irregularity which is different from that observed in stranded wires and perforated metal sheets, and which is sufficient to provide improved physical bonding between the metal and the conductive polymer. Thus in one aspect the present invention provides an electrical device which comprises (1) an element composed of a conductive polymer, and
(2) at least one metal electrode having a microrough surface which is in direct physical contact with the conductive plymer element.

BRIEF DESCRIPTION OF THE DRAWING

The invention is illustrated in the accompanying drawing in which:

FIG. 1 is a side view of a device of the invention.

DETAILED DESCRIPTION OF THE INVENTION

The microrough surface of the electrodes used in the present invention can be prepared in a number of different ways. The preferred method is electrodeposition, the microrough surface being the surface which is exposed to the electrolyte. For example, electrodeposited foils, particularly copper and nickel foils, are preferred for use in this invention. It is also possible to use other processes which result in a similar degree of roughness, e.g. irregularities which protrude from the surface by a distance of at least 0.03 microns, preferably at least 0.1 microns, particularly 0.1 to 100 microns, and which have at least one dimension parallel to the surface which is at most 500 microns, preferably at most 100 microns, particularly at most 10 microns, and which is preferably at least 0.03 micron, particularly at least 0.1 micron. The irregularities can be of the same shape as those produced by electrodeposition, e.g. generally spherical nodules protruding from the surface, or they can be of a different shape. Such processes can create the microrough surface by removal of material from a smooth surface, e.g. by etching, by chemical reaction with a smooth surface, e.g. by galvanic deposition, or by deposition of a microrough layer of the same or a different material on a smooth surface. A smooth foil can be treated by contact e.g. rolling or pressing with a patterned surface to generate a microroughness. The microrough surface can if desired be treated to change its chemical characteristics. For example, an electrodeposited metal foil can be passivated i.e. rendered inactive or less chemically reactive, by an appropriate treatment, e.g. one which provides a coating thereon of a water-stable oxide, especially a zinc-nickel or nickel treatment of an electrodeposited copper foil. Such treatment is for example desirable where the metal may catalyse degradation of the conductive polymer. Such treatment can also be carried out so as to provide appropriate acid-base interactions with the conductive polymer.

We have found that metal foils having a microrough surface which has a structure comprising "macronodules" which themselves comprise "micronodules" provide particularly good adhesion. Macronodules are irregularities which protrude from the surface and have one dimension parallel to the surface which is at most 50 microns, preferably at most 25 microns, particularly at most 15 microns, and is at least 3 microns. Micronodules are irregularities which may form part of a macronodule or protrude from the surface and which have one dimension parallel to the surface which is at most 4 microns, preferably at most 3 microns, particularly at most 2 microns, and is at least 0.1 micron, preferably at least 0.5 micron. During electrodeposition, the process which is preferably used to form this type of structure, micronodules grow together in clusters to form macronodules. The resulting surface thus comprises both macronodules and micronodules. The electrodes particularly useful for this invention have a surface which comprises at least 50 percent macronodules, preferably at least 60 percent macronodules, particularly at least 80 percent macronodules, most particularly consists essentially of macronodules. The surface comprising macronodules may be made of the same or a different material from the metal foil.

Through the use of microrough surfaces on the electrodes, the range of conductive polymers which can be used is increased. For example, when using a conventional metal foil, it is often necessary for the conductive polymer to include a polar copolymer or other polymeric ingredient which provides improved adhesion to the metal foil but whose presence detracts from the desired electrical characteristics. Thus this invention makes it possible to use a wider range of conductive polymers (both PTC and ZTC) in situations in which separation of the electrode and the conductive polymer is an anticipated problem, either as a result of flexing, different coefficients of expansion, exposure to solvents, e.g. diesel fuel, or thermal or electrical shock. Suitable conductive polymers are disclosed in the documents incorporated herein by reference. Preferrred conductive polymers include those based on polyolefins, particularly high density polyethylene, and those based on fluoropolymers, particularly polyvinylidene fluoride. Advantages of the improved adhesion include the ability to punch very small parts from foil laminates and substantially improved life, even when exposed to high voltages.

The suitability of a particular metal foil for use in this invention, in particular its ability to adhere adequately to the conductive polymer, can be assessed by the use of a standard test which is used in industry to measure the level of adhesion of an electrodeposited copper foil to an epoxy board, namely MIL 13149, "Epoxy Board FR-4 Peel". We have found that for electrodeposited nickel foils preferred results are achieved by using a nickel foil which, when used in place of an electrodeposited copper foil in MIL 13149, has a peel strength of at least 9 pounds/linear inch when measured on FR-4 epoxy board.

The invention can be used in any of the devices described in the documents incorporated herein by reference, including in particular circuit protection devices, particularly laminar devices having for example a resistance of less than 100 ohms, particularly less than 25 ohms, especially less than 1 ohm. Very small laminar devices, having at least one laminar dimension which is less than 0.2 inch, e.g. less than 0.15 inch, and even smaller, such as less than 0.1 inch, can be prepared by punching a foil laminate. Other useful devices include self-limiting heaters, especially flexible sheet heaters having a total surface area of at least 1.0 square inch.

The present invention has been found to be of particular value for circuit protection devices comprising columnar electrodes, e.g. solid or stranded wires, which are embedded in a PTC conductive polymer. We have found that in many such devices, when using conventional wires, it is desirable to coat the wires with a graphite-containing composition before contacting them with the molten conductive polymer, in order to obtain devices with satisfactory stability. By using electrodes having a microrough surface, devices of comparable or better stability can be obtained without the use of such a coating. Solid or stranded wires on which a layer of the same or a different metal has been formed by electrodeposition may be used. Particularly preferred are copper wires on which a nickel coating has been formed by electrodeposition.

The invention is illustrated by the following Examples.

EXAMPLE 1

The ingredients listed in the Table below were tumble-blended, mixed in a Banbury mixer, melt-extruded into a water bath and chopped into pellets. After drying, the pellets were extruded as a sheet 8.25 inch (21.0 cm) wide and 0.030 inch (0.076 cm) thick, and samples 6 inch (15.3 cm) square were cut from the sheet.

Each sample was laminated between two metal foils 6×6×0.0014 inch in a heated press at 260° C. and 4,000 lb. pressure for 2 minutes, followed by 7,000 lb. pressure for 3 minutes. The metal foils were electrodeposited copper foils which had been passivated with nickel and zinc on the surface adjacent the sample. Such foils are available from Yates Industries under the trade name TWI.

Disc-shaped devices 0.125 inch (0.318 cm) in diameter were punched from the laminates. A 24 AWG nickel-plated steel lead was attached to each metal foil on each device. The devices were then encapsulated by an epoxy resin which was cured at 110° C. for 3 hours.

The physical and electrical stability of the foil/conductive polymer interface remained excellent under a wide variety of conditions.

A device 10 of Example I is shown in FIG. 1. The device 10 comprises a laminar element 12 which is composed of a conductive polymer exhibiting PTC behavior and first and second electrodeposited metal foil electrodes (numerals 14 and 16), which electrodes 14 and 16 are in direct physical contact with a surface of the conductive polymer element 12.

EXAMPLE 2

Following substantially the same procedure as in Example 1, devices were made from a conductive polymer containing the ingredients listed in the Table below.

TABLE

| Ingredient | Example 1 | | | Example 2 | | |
| --- | --- | --- | --- | --- | --- | --- |
| | wt (g) | wt % | vol % | wt (g) | wt % | vol % |
| High density polyethylene (Marlex 6003) | 6200 | 31.5 | 56.1 | 8092 | 49.3 | 63.9 |
| Carbon black (Sterling SO) | 5310 | 27.0 | 25.7 | — | — | — |
| Carbon black (Statex G) | — | — | — | 8071 | 49.0 | 34.1 |
| Titanium dioxide (TiPure R101) | 7955 | 40.5 | 16.5 | — | — | — |
| Antioxidant | 205 | 1.0 | 1.7 | 276 | 1.7 | 2.0 |

NOTES:
Marlex 6003 is available from Phillips Petroleum and is a high density polyethylene with a melt index of 0.3 and a melting point of about 135° C.
Sterling SO is a carbon black available from Cabot. It has a particle size of 41 millimicrons and a surface area of 42 m²/g.
Statex G is available from Columbian Chemicals and is a carbon black with a particle size of about 60 millimicrons and a surface area of 36 m²/g.
TiPure R101 is a titanium dioxide available from Du Pont.
The antioxidant used was an oligomer of 4,4-thiobis (3-methyl-6-tert butyl phenol) with an average degree of polymerization of 3-4, as described in U.S. Pat. No. 3,986,981.

EXAMPLE 3

The following ingredients were mixed following the above procedure.

| | wt. (g) | wt. % | vol. % |
| --- | --- | --- | --- |
| Carbon black (Vulcan XC-72) | 3,915 | 19.2 | 19.0 |
| Polyvinylidene fluoride (KF 1000) | 15,701 | 76.8 | 77.5 |
| Calcium Carbonate (Omya Bsh) | 618 | 3.0 | 2.0 |
| Prorad | 199 | 1.0 | 1.5 |

The pellets were extruded into a sheet 11 inch (27.9 cm) wide and 0.020 inch (0.051 cm) thick and were irradiated 20 Mrad using a 1.5 MeV electron beam. Samples 6 inch (15.3 cm) square were cut from the sheet. Two samples of polymer sheet were laminated between two (6×6 in) sheets of (1 ounce) electrodeposited copper foil by exposing to 1500 lbs pressure at 200° C. for 4 minutes, 20,000 lbs pressure for 2 minutes, before cooling at 20,000 lbs pressure in a water-cooled press. Such foils are available from International Foils. The resulting sheet was 0.035 inch (0.089 cm). Flat 0.005 inch (0.013 cm) copper leads were soldered onto 1 inch (2.54 cm)×2 inch (5.08 cm) samples cut from the slab. The heaters were then encapsulated in epoxy.

KF 1000 is a polyvinylidene fluoride available from Kureha.

Vulcan XC-72 is a carbon black available from Cabot with a particle size of 30 millimicrons and a surface area of 254 m²/g.

Omya Bsh is $CaCO_3$ available from Omya Inc.

The prorad used is triallylisocyanurate.

EXAMPLE 4

7945 g. of high density polyethylene (Marlex 6003 available from Phillips Petroleum), 7200 g. of carbon black (Statex G available from Columbian Chemicals) and 263 of antioxidant were mixed together, melt-extruded into a water bath and chopped into pellets. After drying, 12,185 g. of the pellets were mixed with 4726 g. of alumina trihydrate (Hydral 705 available from Alcoa), melt-extruded into a water bath and chopped into pellets. After drying, the pellets were melt-extruded through a crosshead die around two preheated 22 AWG solid copper wires that had been electroplated with nickel to a nominal thickness of 300 to 500 microinch (0.762–1.27 mm). The resulting strip (about 0.58 by 0.25 cm) was irradiated to 75 Mrad using a 1 MeV electron beam. The irradiated strip was cut into lengths of about 1 cm long, from which circuit protection devices were prepared in which the conductive polymer element was about 0.76 cm long and the electrodes extended from one side of the PTC element by about 0.25 cm.

We claim:

1. An electrical device which comprises
   (1) an element composed of a conductive polymer, and
   (2) at leat one metal electrode having a microrough surface which
       (i) comprises nickel,
       (ii) is in direct physical contact with the conductive polymer element, and
       (iii) has a surface comprising at least 50 percent macronodules.

2. A device according to claim 1 wherein the electrode is an electrodeposited nickel foil.

3. A device according to claim 1 wherein the electrode has been prepared by a nickel treatment of an electrodeposited copper foil.

4. A device according to claim 1 wherein the conductive polymer exhibits PTC behavior.

5. A device according to claim 1 wherein the conductive polymer is based on a polyolefin.

6. A device according to claim 1 wherein the microrough surface has irregularities which (i) protrude from the surface by a distance of 0.1 to 100 microns and (ii) have at least one dimension parallel to the surface which is at most 100 microns.

7. A device according to claim 1 wherein the macronodules (i) have one dimension parallel to the surface which is at most 25 microns, and (ii) comprise micronodules having one dimension parallel to the surface which is at most 2 microns.

8. A device according to claim 7 wherein the macronodules (i) have one dimension parallel to the surface which is at most 15 microns and (ii) comprise micronodules having one dimension parallel to the surface which is 0.5 to 2 microns.

9. A device according to claim 7 wherein the microrough surface comprises at least 80 percent macronodules.

10. An electrical device which comprises
 (1) a laminar element which is composed of a conductive polymer,
 (2) a first electrodeposited metal foil electrode which is in direct physical contact with one surface of the conductive polymer element, and
 (3) a second electrodeposited metal foil electrode which is secured to the other surface of the conductive polymer element,
each of said electrodes having a microrough surface which
 (i) is compose of nickel,
 (ii) is in direct physical contact with the conductive polymer element,
 (iii) has irregularities which protrude from the surface by a distance of 0.1 to 100 microns and have at least one dimension parallel to the surface which is at most 100 microns, and
 (iv) has a surface comprising at least 60 percent macronodules.

11. A device according to claim 10 which is a circuit protection device having a resistance of less than 100 ohms at room temperature and wherein the conductive polymer exhibits PTC behavior.

12. A device according to claim 10 which is a self-regulating heater having a total surface area of at least 1.0 square inch.

13. A device according to claim 10 which is a heater and wherein the conductive polymer exhibits ZTC behavior.

14. A device according to claim 10 wherein each of the electrodes is an electrodeposited nickel foil.

15. A device according to claim 10 wherein each of the electrodes has been prepared by a nickel treatment of an electrodeposited copper foil.

16. A device according to claim 10 wherein each of the microrough surfaces comprises at least 80% of macronodules which (i) have one dimension parallel to the surface which is at most 25 microns and (ii) comprise micronodules having one dimension parallel to the surface which is at most 2 microns.

17. A device according to claim 16 wherein each of the microrough surfaces consists essentially of macronodules which (i) have one dimension parallel to the surface which is at most 15 microns and (ii) comprise micronodules having one dimension parallel to the surface which is 0.5 to 2 microns.

* * * * *